(12) United States Patent
Janssen et al.

(10) Patent No.: US 7,058,206 B1
(45) Date of Patent: *Jun. 6, 2006

(54) METHOD FOR INCREASING THE POWER OF A TRAFFIC SIGN RECOGNITION SYSTEM

(75) Inventors: Reinhard Janssen, Ulm (DE); Frank Lindner, Blaustein (DE); Berthold Ulmer, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/831,798

(22) PCT Filed: Nov. 13, 1999

(86) PCT No.: PCT/DE99/03627

§ 371 (c)(1),
(2), (4) Date: May 14, 2001

(87) PCT Pub. No.: WO00/30024

PCT Pub. Date: May 25, 2000

(30) Foreign Application Priority Data

Nov. 14, 1998 (DE) .............................. 198 52 631

(51) Int. Cl.
*G06K 9/00* (2006.01)
*H04N 7/00* (2006.01)
*H04N 7/18* (2006.01)
*H04N 9/47* (2006.01)
*G08G 1/095* (2006.01)

(52) U.S. Cl. ...................... 382/104; 348/113; 340/907

(58) Field of Classification Search ................ 382/104, 382/224; 340/907, 933; 348/113; 701/117, 701/120; 342/36, 454
See application file for complete search history.

(56) References Cited

U.S. PATENT DOCUMENTS 6,266,442 B1 * 7/2001 Laumeyer et al. .......... 382/190
6,466,260 B1 * 10/2002 Hatae et al. ................ 348/149

OTHER PUBLICATIONS

Piccioli et al., "Robust method for read sign detection and recognition," Image Vision Computing, Aug. 25, 1995, pp. 209-223.*
Escalera et al., "Road Traffic Sign Detection and Classification", IEEE, Dec. 1997, pp. 848-858.*

(Continued)

*Primary Examiner*—Brian Werner
*Assistant Examiner*—Shefali Patel
(74) *Attorney, Agent, or Firm*—Akerman Senterfitt; Stephan A. Pendorf

(57) ABSTRACT

A method and device that increase the performance of prior art systems that recognize and display the contents of traffic signs. The amount of computer capacity required for real time operation is reduced and the display quality of the contents of known traffic signs is improved. The system for recognizing and/or displaying traffic signs comprises a camera and an evaluation unit connected thereto for image recognition and/or display. The system uses information stemming from at least one map-based navigation system and/or one travel information system in order to recognize and/or display the contents of traffic signs.

7 Claims, 1 Drawing Sheet

OTHER PUBLICATIONS

Kehtarnavaz, et al., "Traffic Sign Recognition in Noisy Outdoor Scenes," Intelligent Vehicles, IEEE, Sep. 25-26, 1995, pp. 460-465.*

Estevez, et al., "A Real-Time Histographic Approach to Road Sign Recognition," Image Analysis and Interpretation, Apr. 8-9, 1996, IEEE, pp. 95-100.*

Janssen, et al., "Hybrid Approach for Traffic Sign Recognition," Intellignet Vehicles, IEEE, Jul. 14-16, 1993, pp. 390-395.*

Priese, et al., "New Results on Traffic Sign Recognition," Intelligent Vehicles, IEEE, Oct. 24-26, 1994, pp. 249-254.*

Priese, et al., "Ideogram Identification in a Realtime Traffic Sign Recognition System," Intelligent Vehicles, IEEE, Sep. 25-26, 1995, pp. 310-314.*

Estable, et al., "A Real-Time Traffic Sign Recognition System," Intelligent Vehicles, IEEE, Oct. 24-26, 1994, pp. 213-218.*

* cited by examiner

METHOD FOR INCREASING THE POWER OF A TRAFFIC SIGN RECOGNITION SYSTEM

BACKGROUND OF THE INVENTION

1. Field of the Invention

The invention concerns a process for improving the performance of a system for recognizing and/or indicating traffic signs.

2. Description of the Related Art

Documents DE 3619824 C2 and DE 198 52 631 A1 disclose processes and devices which recognize, classify and cause to be displayed traffic signs extracted from images of traffic scenes. Herein the processes analyze the image data provided by image sensors without any pre-recognition regarding the actual scenario. For this reason these known processes are time consuming and require a high computer capacity and performance in order to be able to process this data in real time.

Japanese document JP 06348991 discloses a system and a process for recognizing traffic signs, wherein the system employs a color camera and a therewith associated evaluation unit for image recognition. The invention is concerned with the task of, by evaluating the color information from the image information, automatically recognizing lane boundaries and devices for regulating traffic. Herein however there is no supplementation of the image information from the color camera with information from a map-based navigation system or a traffic information system for enhancing the recognition performance of the system.

SUMMARY OF THE INVENTION

The task of the invention is thus to provide a process and a device, which enhances the performance of previously known systems for recognizing and displaying the contents of traffic signs. To accomplish this, on the one hand, the computer capacity and performance required for the real time operation must be reduced and, on the other hand, the display quality of the information contents of recognized traffic signs must be improved.

DESCRIPTION OF THE DRAWINGS

The invention will be described in greater detail on the basis of the figures wherein.

DETAILED DESCRIPTION OF THE INVENTION

The task is solved by a process and a device, in which a system for recognizing and/or indicating traffic signals, the system including a camera and a therewith associated evaluation unit for image recognition and/or for image display, utilizes a map-based navigation system and/or information originating from a traffic information system in the recognition and/or the display of the content of traffic signs.

In one conceivable embodiment of the invention the communication between the system for recognizing and/or display of traffic signs and the map-based navigation system or as the case may be the traffic information system occurs via a vehicle on-board data bus.

Figure 1:
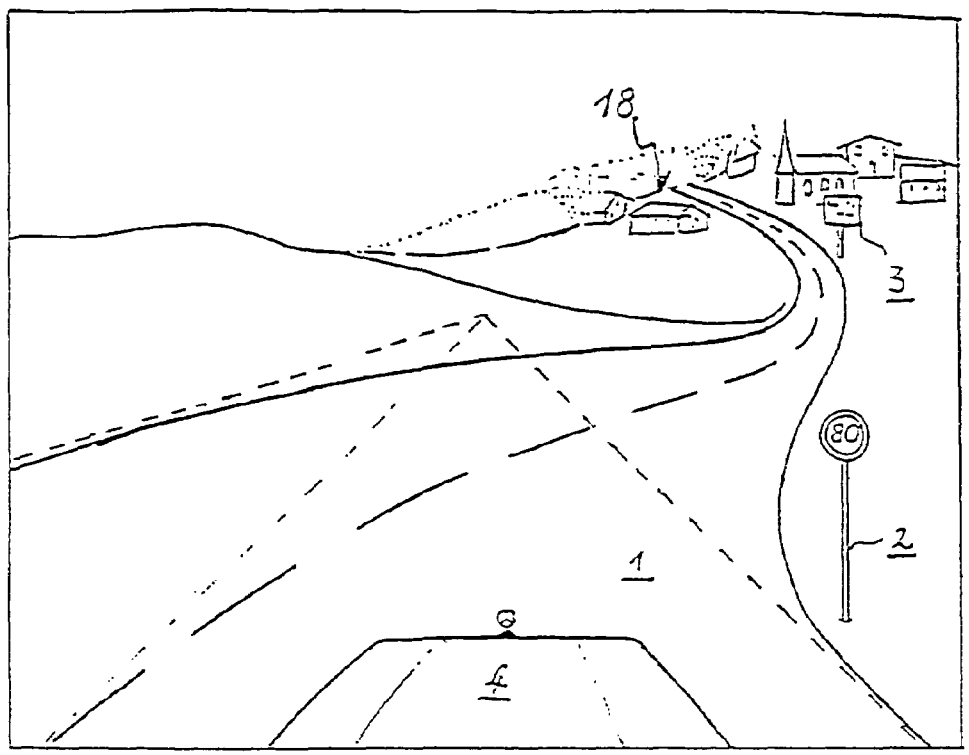
FIG. 1 shows the vehicle environment of a vehicle traveling on a road.
Figure 2:
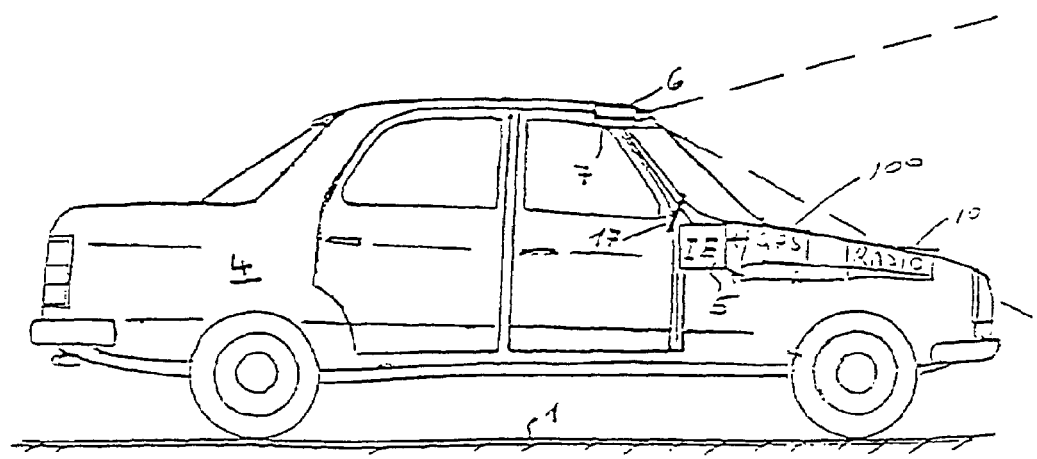
FIG. 2 shows the traffic sign recognition system as installed in a vehicle.

FIG. 1 shows the vehicle environment of a vehicle 4 traveling on a road 1, beside which there is a speed limit sign 2 and an information sign 3 indicating the city limits of a city 18. As shown in FIG. 2, a camera 6 is optionally mounted on a device 7 for directing the aim of the camera 6. Information processing unit 5 receives data from the camera 6, as well as information from a map based information system 100 and/or a traffic information system 101. If the information from the map based information system 100 or traffic information system 101 indicates that the vehicle is on a highway, then the information processing unit searches the data from the camera to find highway speed limit signs 2. Having recognized the speed limit sign, the image is processed in order to determine maximum permissible speed, and this speed limit is displayed to the driver on a display 17. If the information from the map based information system 100 or a traffic information system 101 indicates that the vehicle is nearing a city 18, then the information processing unit searches the data from the camera to find signs 3 indicating the city limits of a city 18. If the traffic information system 101 receives a message that fog or rain may be in the area in which the vehicle is located, there is a presumption of increasingly poor contrast in the image data, and in response the information processing unit 5 enhances the contrast of the images.

Preferably, the system for detection of traffic signs can be switched to enhanced performance when, on the basis of information as could be supplied by the map-based navigation system and/or the traffic information system, it can be determined that the vehicle is passing through an area in which a reliable detection of traffic signs may be problematic. Examples of such areas in which caution is to be taken include transition areas for entry and departure of residential areas. There signs can be found indicating entry of a residential area and departure from a residential area, which imply speed limitations or, as the case may be, lifting of the speed limitations. These signs are however not round as conventional, but rather square. The signs are easily confused with commercial signs, particularly when traffic sign recognition is carried out using monochrome cameras, since here the relatively significant yellow coloration of the signs cannot be used as a recognition criteria. A further area in which particular care is to be taken is the environment of traffic influencing-facilities and change or detour signs. Here one must presume special display and arrangement of the traffic signs, such as for example an intense representation of the black and white parts of the traffic sign as provided for improved night visibility. There is also an increased possibility of a suddenly occurring change or switching on of a traffic sign symbol, for example, sudden speed reduction to 120 km/h on highways. A particular type of traffic sign is a traffic light. In principle these can be classified with signs which change, since the condition of the display can change and therewith an increased observance is required. Using map-based information it is however possible to operate the system with increased recognition performance for recognition of traffic signs in areas of traffic lights (intersections, train crossings).

While the above examples were concerned principally only with interaction with information from map-based navigation systems, examples of situations will be presented below in which increased recognition performance is required and which are advantageously associated with information originating from traffic information systems. This is essentially information advising that poor visibility due to fog or rain exists in certain regions traveled by the vehicle. In such a situation there is a presumption of increasingly poor contrast in the image data, so that the system for traffic sign recognition preferably must enhance the contrast improvement of the images. Preferably information regarding traffic jams is also taken into consideration, since here advanced notification can be given to the observer, in the form of the display of symbols of a traffic jam, a useful distance in advance of the traffic jam, without even having to pass such a traffic sign.

By this inventive possibility of temporarily varying the performance of the traffic sign recognition system, this opens the possibility of economically realizing a system for recognition of traffic signs. It is also advantageous that it is not necessary to provide a system, which in normal operating conditions is inadequately tasked and only in critical situations is completely occupied. Rather, the possibility is presented of using modern multi-processor data processing units taking advantage of the internal vehicle data communications and the number of available data processors present in modern vehicles to utilize the temporarily free, unutilized computer capacity in productive economic employment.

A further advantageous design characteristic of the invention is comprised therein, that information regarding the type and/or the position and/or the condition and/or the visibility and/or the size of a recognized traffic sign can be stored in an data storage unit. This data storage unit can either be associated with a map-based navigation system or, as the case may be, a traffic information system, or alternatively may be a component of the system for traffic sign recognition and/or display. By the integration of this data storage unit the observer can be alerted, via an acoustic or optical signal, to the fact that along a previously traveled path a change in respect to the position or the presence or absence of a vehicle sign has occurred. Thereby it is possible to alert the observer to, for example, construction-site-specific traffic regulations or, in the case of changed right-of-way, regulations in a crossing situation. It is further of advantage when, in the same manner, a warning signal is provided to the observer when the system for traffic sign recognition does not recognize an actual traffic sign or cannot classify it adequately.

The invention further provides benefits, when on the basis of the map-based position determination the possibility is presented to initiate or allow a program for use of a decision logic which limits the display a traffic sign for such a time, until a predetermined road distance has been traveled. This predetermined road distance is preferably classification specific and can be supplied using a storage unit or hard drive. For example in Germany the changing of streets is implicitly associated with the lifting of restrictions, such as speed limit restrictions. In addition, speed limits must be repeated at least every 3 km otherwise they are presumed to be rescinded. By this characteristic according to the invention it is achieved that a traffic sign can be displayed only as long as absolutely necessary even without explicit rescinding.

The invention has particularly advantageous benefits in combination with a system for recognition of traffic signs, in which the image data of the image sensor is analyzed and classified in an information-processing unit and, on the basis of the result, is stored in memory as image data representing class-specific image segments and/or symbolic figures, which are then displayed by means of the display unit. Therein, in the framework of the analysis by the information-processing unit, it is determined whether the image data of the image sensor contains one or more objects, which with sufficiently high probability are traffic signs. Consequently the so-detected objects are forwarded to a further processing and classification step. In a particularly advantageous manner, in the framework of the invention, during the further processing of the image data of the objects, a separation is undertaken into the traffic sign specific upper classes and lower classes. Thereby appropriate classification-specific characteristic data are extracted and relayed to a separate classification. Depending on whether the classification specific characteristic data are correctly recognized with high probability during the classification, they are replaced by the corresponding or appropriate symbolic image representing image data stored in the storage unit or by the appropriate original image data stemming from the image sensor. The image data resulting from the dissections are recombined into a synthetic image of a traffic sign and this image is then stored in the memory unit and brought to the display by means of the display unit.

An important advantage of the invention is comprised therein, that it is no longer necessary to carry out the computer taxing and with high error quotient associated problem of classification of a relatively complex traffic sign which must be solved over its entirety, rather the problem, by separation of the detected objects into traffic sign specific upper classes and lower classes in a preceding classification process, is dissected or redirected to clearer and therewith simpler classification problems. Therewith in like measure the demands on the necessary computing power and the image quality are reduced.

A brief example will now be given using a speed limit sign for the separation of the traffic sign into traffic sign specific upper classes and lower classes. The traffic sign specific upper class of this traffic sign belongs to the class of regulating signs, which have a characteristic round shape with an internal symbol therein. In this special cases of a traffic speed limiting sign, the integrated symbol is a number which is circumscribed by a broad, red ring. In the case of this traffic speed limit indicating sign the internally lying symbol, that is the indication as to the speed to which a vehicle speed is to be limited, is an element of the traffic sign specific lower class.

In the system for traffic sign recognition, with which advantageously the invention for improving the performance of a system for recognition and/or display of traffic signs can be combined, it should now be possible with comparatively low computer power and with low equipment expense (for example, a monochrome camera instead of a high resolution color camera) to check in real time whether the object of a particular shape within the detected or observed image is an actual traffic sign. If this is the case, then the classification specific characteristic data of the object are supplied to a separate classification for identification of the traffic sign. Generally a hierarchically organized classifier is employed for identification of the traffic sign. The classification occurs therein in multiple steps. For this, first the characteristic data or features associated with the upper class of the object are supplied to the classification. If a classification occurs successfully (that is, the class could be correctly recognized with high confidence), then the characteristic data are replaced by the appropriate symbolic representation of the object stored in the memory unit. If the classification is unsuccessful (that is, the class could not be recognized with high confidence), then the characteristic data of the upper class and the characterizing data of the lower class are replaced by the original image data originally stemming from the image sensor and the image classification process is ended. A further step within the classification procedure is initiated when the classification of the upper class was successful. In this case, the characterizing data belonging to the lower class of the object are subsequently supplied to a classifier. In the case of successful classification of this lower class (that is, the class could be recognized with high confidence), then the characterizing data are replaced by the appropriate or corresponding symbolic representation of the lower class stored in the memory unit. On the other hand, in the case of unsuccessful classification (that is, the class could not be recognized with high confidence) the characterizing data of the lower class is replaced by the corresponding original image data stemming from the image sensor.

With this hierarchical process a low error rate traffic sign recognition is provided. Therein both hierarchical steps for identification of the upper class or as the case may be the identification of the lower class may themselves again be hierarchically organized. With respect to the design of the classifiers employed within the hierarchical classification it is conceivable to so design these, that they make decisions on the basis of a comparison of the distance of the characterizing data supplied to them from the class typical characterizing data sets stored in the memory unit. Thereby the traffic sign identifying object is assigned to that respective upper class, to which the distance in the measurement space is the lowest. Thereby it is possible to so define a tolerance threshold which is compared with a minimal distance value, wherein the distance value falling below the tolerance threshold serves as indicator to a high probability of correct occurrence of recognition. In another advantageous design it is also possible to so design the classifiers, that they can be trained with the aid of a traffic sign specific learning succession of passes. This process is particularly advantageous, since the quality of the image data delivered by the image sensor depends strongly upon the environmental factors such as weather and light relationships.

What is claimed is:

1. A process for improving performance of a system for recognizing traffic signs, said system including a camera and a therewith associated evaluation unit for image recognition or image display, said process comprising:
   utilizing information originating from at least one of
   (a) a map-based navigation system and
   (b) a traffic information system
   in the evaluation or display of contents of traffic signs,
      wherein the system for traffic sign recognition is capable of operating at a normal performance level and at least one enhanced performance level, and wherein said system is caused to operate at said enhanced performance level when it is determined on the basis of map-based information or traffic information that the vehicle is passing through an area in which recognition of traffic signs may be problematic,
      wherein within said problematic areas supplemental subdivided recognition processes are carried out, comprising:
   a) when entering or leaving communities, carrying out a specific search for signs indicating entry of a community and leaving of a community,
   b) when in the area of traffic influencing facilities, changing signs or traffic lights, searching for any change in the type and manner of the representation of the traffic signs,
   c) when in an area in which poor visibility due to fog or rain may be present and a higher probability of contrast-poor images may be required, effecting an increase in the contrast enhancement of the image data.

2. A process for improving performance of a system for recognizing traffic signs, said system including a camera and a therewith associated evaluation unit for image recognition or image display, said process comprising:
   utilizing information originating from at least one of
   (a) a map-based navigation system and
   (b) a traffic information system
   in the evaluation or display of contents of traffic signs,
      wherein the system for recognition of traffic signs, during the processing of image data provided by an image sensor:
      examines these image data for the presence of traffic signs,
      extracts data corresponding to traffic signs,
      separates the extracted data into upper and lower classes and in association therewith extracts class-specific characterizing data, and
      supplies these extracted class-specific characterizing data to a separate classification.

3. A process according to claim 2, wherein the classification occurs hierarchically, in multiple classification steps.

4. A process according to claim 2, wherein the classification steps are essentially set up follows:
   a) first, only the characterizing data associated with the upper class of the object is supplied to a classifier,
   aa) upon successful classification, wherein the class is recognized correctly with a high degree of confidence, the characterizing data are replaced by the appropriate symbolic representation of the upper class stored in the memory unit,
   ab) upon unsuccessful classification, wherein the class could not be correctly recognized with a high degree of confidence, the characterizing data for the upper class and the characterizing data for the lower class are replaced by the corresponding original image data originating from the image sensor,
   b) if the classification of the upper class was successful, then subsequently the characterizing data associated with the lower class of the object are supplied to a classifier,
   ba) upon successful classification, wherein the class is recognized with a high degree of confidence, the characterizing data are replaced by the appropriate symbolic representation of the lower class stored in the memory unit,
   bb) upon unsuccessful classification, wherein the class could not be correctly recognized with a high degree of confidence) the characterizing data for the lower class are substituted by the original image data from the image sensor.

5. A vehicle-mounted device for enhancing the performance of a system for recognizing traffic signs, which system includes a camera and a therewith associated evaluation unit for image recognition or for image display,
   wherein said system is associated with at least one of (a) a map-based navigation system and (b) a traffic information system so as to utilize information originating therefrom in the process of recognition or display of contents of traffic signs,
   wherein a processing unit is provided in the system for recognition of traffic signs, which processing unit includes a program according to which it examines image data supplied by an image sensor for the presence of traffic signs, then extracts these data, separates these into upper and lower classes and in this context extracts class specific characterizing data and separately supplies these to a classifier.

6. A device according to claim 5, wherein this classifier is constructed hierarchically, in multiple classification steps.

7. A device according to claim 6, wherein the classification steps are so constructed, that the classifier accomplishes the following functionalities:
- a) first, only the characterizing data associated with the upper class of the object is supplied to a classifier,
- aa) upon successful classification, wherein the class is recognized correctly with a high degree of confidence, the characterizing data are replaced by the appropriate symbolic representation of the upper class stored in the memory unit,
- ab) upon unsuccessful classification, wherein the class could not be correctly recognized with a high degree of confidence, the characterizing data for the upper class and the charactering data for the lower class are replaced by the corresponding original image data originating from the image sensor,
- b) if the classification of the upper class was successful, then subsequently the characterizing data associated with the lower class of the object are supplied to a classifier,
- ba) upon successful classification, wherein the class is recognized with a high degree of confidence, the characterizing data are replaced by the appropriate symbolic representation of the lower class stored in the memory unit,
- bb) upon unsuccessful classification, wherein the class could not be correctly recognized with a high degree of confidence) the characterizing data for the lower class are substituted by the original image data from the image sensor.

* * * * *